(12) United States Patent
Rubinstein et al.

(10) Patent No.: US 12,323,620 B2
(45) Date of Patent: Jun. 3, 2025

(54) VOLUMETRIC VIDEO IN WEB BROWSER

(71) Applicant: TETAVI LTD., Ramat Gan (IL)

(72) Inventors: Ofer Rubinstein, Herzliya (IL); Yigal Eilam, Kiryat Ono (IL); Michael Birnboim, Holon (IL); Vsevolod Kagarlitsky, Ramat Gan (IL); Gilad Talmon, Tel Aviv (IL); Michael Tamir, Tel Aviv (IL)

(73) Assignee: TETAVI LTD., Ramat Gan (IL)

( * ) Notice: Subject to any disclaimer, the term of this patent is extended or adjusted under 35 U.S.C. 154(b) by 202 days.

(21) Appl. No.: 17/824,045

(22) Filed: May 25, 2022

(65) Prior Publication Data

US 2022/0385941 A1 Dec. 1, 2022

Related U.S. Application Data

(60) Provisional application No. 63/192,643, filed on May 25, 2021.

(51) Int. Cl.
*G06T 9/00* (2006.01)
*H04N 19/186* (2014.01)
*H04N 19/597* (2014.01)

(52) U.S. Cl.
CPC ............ *H04N 19/597* (2014.11); *G06T 9/00* (2013.01); *H04N 19/186* (2014.11)

(58) Field of Classification Search
CPC ........... G06T 9/00; G06T 9/001; H04N 9/001; H04N 19/001
USPC ........................................................ 375/240
See application file for complete search history.

(56) References Cited

U.S. PATENT DOCUMENTS

| | | | |
|---|---|---|---|
| 8,284,204 B2 | 10/2012 | Kalaiah et al. | |
| 10,897,614 B2* | 1/2021 | Hannuksela | H04N 13/111 |
| 2008/0007559 A1* | 1/2008 | Kalaiah | H04N 13/275 |
| | | | 345/419 |
| 2013/0307848 A1* | 11/2013 | Tena | G06T 17/205 |
| | | | 345/420 |
| 2017/0078703 A1* | 3/2017 | Ridge | H04N 19/184 |
| 2017/0154461 A1* | 6/2017 | Rhee | G06V 10/426 |
| 2019/0080483 A1* | 3/2019 | Mammou | H04N 19/593 |
| 2020/0410752 A1* | 12/2020 | Jiang | G06T 15/20 |

(Continued)

FOREIGN PATENT DOCUMENTS

| | | |
|---|---|---|
| EP | 2810253 | 12/2014 |
| EP | 3316589 | 5/2018 |
| EP | 3334164 | 6/2018 |

OTHER PUBLICATIONS

Hugues Hoppe. 1997. View-dependent refinement of progressive meshes. In Proceedings of the 24th annual conference on Computer graphics and interactive techniques (SIGGRAPH '97). ACM Press/Addison-Wesley Publishing Co., USA, 189-198. https://doi.org/10.1145/258734.258843. Hereinafter "Hoppe". (Year: 1997).*

(Continued)

*Primary Examiner* — William C Vaughn, Jr.
*Assistant Examiner* — Astewaye Gettu Zewede
(74) *Attorney, Agent, or Firm* — The Roy Gross Law Firm, LLC; Roy D. Gross

(57) ABSTRACT

The present invention generally pertains to systems, methods, and non-transitory processor-readable mediums for ensuring a match between geometry and texture when playing volumetric videos in a web browser.

12 Claims, 7 Drawing Sheets

(56) References Cited

U.S. PATENT DOCUMENTS

2021/0241526 A1* 8/2021 Padovani ................ G06T 17/20
2021/0390789 A1* 12/2021 Liu ...................... G06V 40/161

OTHER PUBLICATIONS

Hugues Hoppe. 1997. View-dependent refinement of progressive meshes. In Proceedings of the 24th annual conference on Computer graphics and interactive techniques (SIGGRAPH '97). ACM Press/Addison-Wesley Publishing Co., USA, 189-198. https://doi.org/10.1145/258734.258843 (Year: 1997).*
International search report for PCT/IL2022/050556 dated Sep. 13, 2022.
Search Strategy for PCT/IL2022/050556 dated Sep. 6, 2022.
Written Opinion for PCT/IL2022/050556 dated Sep. 13, 2022.

* cited by examiner

VOLUMETRIC VIDEO IN WEB BROWSER

FIELD OF THE INVENTION

The present invention generally pertains to a system and method for ensuring a match between geometry and texture when playing volumetric videos in a web browser.

BACKGROUND OF THE INVENTION

It is often desired to play a volumetric (3D) video on a web browser. Volumetric videos typically have three types of information, stored in separate files: audio information in an audio file, texture information in a compressed video file and geometric information in a mesh file. When the volumetric video is played, if there is mismatch between the frames being displayed, the quality of the replay is damaged. For example, if the texture frame number differs from the mesh frame number, the displayed image can look ragged. If the audio frame number does not match the mesh frame number, a person's lip movements will not be correlated with the sound. The latter mismatch will not be dealt with herein.

Since the both the texture decoder and the mesh decoder typically work independently and each uses video time and not frame number to decide which frame to decode, mismatch between texture decode frame and mesh decoder frame often occurs. The present invention discloses methods of ensuring that the texture decoder frame number and the mesh decoder frame number will consistently match, ensuring a better-quality displayed image, even in the limited processing environment of a web browser.

U.S. Pat. No. 8,284,204 discloses a device for rendering to multiple viewpoints of a stereoscopic display. The device includes vertex shaders which receive vertices corresponding to primitives and process viewpoint dependent information. The device also includes a primitive replication unit which replicates primitives according to a number of viewpoints supported by the stereoscopic display. The primitive replication unit adds unique view tags to each of the primitives which identify the viewpoint that the respective primitive is destined for. Each replicated primitive is processed by a rasterizer and converted into pixels. The rasterizer adds a view tag to the rasterized pixels so that the pixels identify a respective primitive and identify a respective pixel buffer that the pixel is destined for. The pixels can then be processed by a pixel processing unit and written to a pixel buffer corresponding to a respective viewpoint. The pixels are subsequently output to the stereoscopic display.

However, U.S. Pat. No. 8,284,204 does not suggest any means of verifying that the texture frame number matches the geometry frame number.

U.S. Patent Application Publication No. US2017/0078703 discloses a method comprising: identifying at least one boundary in an image based on one or more signal characteristics; classifying a region of the image containing the boundary as a region containing an edge; determining context-based information about the region to be signaled in a bitstream of video data; partitioning the region at least in two along the edge; and applying a transform on the region.

However, U.S. Pat. No. 8,284,204 does not suggest any means of verifying that the texture frame number matches the geometry frame number.

It is therefore a long felt need to provide a method of displaying volumetric video which does not require modification of the current methods of storing volumetric video and which avoids mismatch between displayed texture and displayed mesh.

SUMMARY OF THE INVENTION

It is an object of the present invention to disclose a system for ensuring a match between geometry and texture when playing volumetric videos in a web browser.

It is another object of the present invention to disclose a method for providing an image, comprising steps of:
- acquiring a data set comprising color data and geometric data, said geometric data being encoded in a same format as said color data;
- generating a set of initial faces;
- determining geometric information of at least one relevant face from said geometric data;
- generating a set of geometry faces, each member of said set of geometry faces being a geometry face, each geometry face corresponding to one of said at least one relevant face; for each of said at least one relevant faces, generating said geometry face by assigning said geometric information of said each of said at least one relevant face to one of said set of initial faces, said one of said set of initial faces having said assigned geometric information being said geometry face;
- rendering an image from a point of view using said set of geometry faces and said color data; wherein geometry of said image and texture of said image are from a same frame of a sequence of frames.

It is another object of the present invention to disclose the method as disclosed above, wherein, for each of said set of geometry faces, said step of assigning said geometric information is effectuated by, for each vertex of said geometry face, assigning to said each vertex of said geometry face a geometric location of a corresponding vertex of said one of said at least one relevant face.

It is another object of the present invention to disclose the method as disclosed above, additionally comprising at least one of the following steps:
a. storing a number of said at least one relevant face and a location of said at least one relevant face in at least one additional line of said data set;
b. storing said color data and said geometry data as either YUV or logarithmic Y'U'V' values;
c. providing said color data comprising a plurality of encoding parameters, each of said plurality of encoding parameters being used in a different portion of said color data;
d. providing said color data comprising a plurality of encoding parameters, each of said plurality of encoding parameters being used in a different portion of said color data;
e. said geometric data being stored only in the most significant bits of geometric data bytes;
f. selecting a number of faces in said set of initial faces to be in a range from 10 to $10^6$;
g. selecting a number of faces in said set of initial faces to be 50,000;
h. providing in metadata in said data set a number of faces in said set of initial faces;
i. selecting a location of said faces in said set of initial faces from a group consisting of noise, a random number, a fixed location, and any combination thereof, and selecting said fixed location from a group consisting of an origin of a coordinate system and a location outside of said point of view; and j. assigning a single location to unused faces, unused faces being faces in set said of initial faces and not in said set of located faces; and selecting said single location from a group consisting of an origin of a coordinated system and a location outside of said point of view.

It is another object of the present invention to disclose a method for providing an image, comprising steps of:
acquiring a data set comprising color data and, for each frame, a frame number;
acquiring geometric data;
generating a set of initial faces;
for each frame:
  determining, from the color data, the frame number;
  determining geometric information of at least one relevant face from said geometric data having said frame number;
  generating a set of geometry faces, each member of said set of geometry faces being a geometry face, each said geometry face corresponding to one of said at least one relevant face; generating said geometry face by assigning said geometric information of said one of said at least one relevant face to one of said set of initial faces, said one of said set of initial faces having said assigned geometric information being said geometry face;
  using said set of geometry faces and said color data, rendering an image from a predetermined point of view;
wherein geometry of said image and texture of said image are from the same frame of a sequence of frames.

It is another object of the present invention to disclose the method as disclosed above, wherein at least one of the following is true:
a. for each geometry face, said step of assigning said geometric information is effectuated by, for each vertex of said geometry face, assigning to said each vertex of said geometry face a geometric location of a corresponding vertex of said one of said at least one relevant face;
b. said relevant faces are generated in a manner selected from a group consisting of for each relevant frame, after a predetermined time, whenever there is a coherency change in the geometry, and any combination thereof, said predetermined time being in a range from 0.01 s to 10 s;
c. selecting a number of faces in said set of initial faces to be in a range from 1 to $10^6$;
d. selecting a number of faces in said set of initial faces to be 50,000; and
e. providing a number of faces in said set of initial faces in metadata in said data set.

It is another object of the present invention to disclose the method as disclosed above, additionally comprising a step after said step of generating a set of geometry faces, said step comprising storing said at least one relevant face, thereby generating a set of stored relevant faces, said set of stored relevant faces comprising all of said at least one relevant face.

It is another object of the present invention to disclose the method as disclosed above, additionally comprising the following steps, after said step of determining said frame number:
for each frame in a plurality of frames, determining geometric information of at least one relevant face from said geometric data;
storing said geometric information for said plurality of frames;
comparing, for said each frame in a plurality of frames, said frame number to a frame number of said each frame in a plurality of frames;
for said frame number being the same as one of said frame number of said each frame in a plurality of frames, selecting for rendering, from said stored geometric information for said each frame in a plurality of frames, geometric information for said frame number; and
for said frame number not being the same as any of said frame number of said each frame in a plurality of frames, selecting for rendering said set of stored relevant faces.

It is another object of the present invention to disclose the method as disclosed above, additionally comprising one of the following steps:
a. selecting a number of said plurality of frames to be in a range from 2 frames to 1001 frames;
b. selecting a number of said plurality of frames to be in a range from 2 frames to 100 frames,
c. selecting a number of said plurality of frames to be in a range from 2 frames to 10 frames,
d. selecting a number of said plurality of frames to be in a range from 2 frames to 5 frames;
e. selecting a number of said plurality of frames to be in a range from 2 frames to 3 frames;
f. selecting a number of said plurality of frames to be 3 frames; and
g. selecting said plurality of frames to comprise a first predetermined number of frames before said frame number and a second predetermined number of frames after said frame number, said first predetermined number of frames being in a range from zero to a first decoder inaccuracy, said second predetermined number of frames being in a range from zero to a second decoder inaccuracy, said first decoder inaccuracy in a range selected from a group consisting of: 0-1 frame 0-2 frames, and 0-500 frames, said second decoder inaccuracy in a range selected from a group consisting of: 0-1 frame 0-2 frames, and 0-500 frames.

It is another object of the present invention to disclose the method as disclosed above, additionally comprising a step of selecting a location of said faces in said set of initial faces from a group consisting of noise, a random number, a fixed location, and any combination thereof.

It is another object of the present invention to disclose the method as disclosed above, additionally comprising a step of selecting said fixed location to be an origin of a coordinate system.

It is another object of the present invention to disclose the method as disclosed above, additionally comprising a step of assigning a single location to unused faces, unused faces being faces in set said of initial faces and not in said set of located faces.

It is another object of the present invention to disclose the method as disclosed above, additionally comprising a step of selecting said single location from a group consisting of an origin of a coordinate system and a location outside of said point of view.

It is another object of the present invention to disclose a set of instructions that, when executed, are configured to provide an image, said instructions comprising steps configured to:
acquire a data set comprising color data and geometric data, said geometric data being encoded in a same format as said color data;
generate a set of initial faces;

determine geometric information of at least one relevant face from said geometric data;

generate a set of geometry faces, each member of said set of geometry faces being a geometry face, each geometry face corresponding to one of said at least one relevant face; for each of said at least one relevant faces, generating said geometry face by assigning said geometric information of said each of said at least one relevant face to one of said set of initial faces, said one of said set of initial faces having said assigned geometric information being said geometry face;

render an image from a point of view using said set of geometry faces and said color data;

wherein geometry of said image and texture of said image are from a same frame of a sequence of frames.

It is another object of the present invention to disclose the set of instructions as disclosed above, wherein, for each of said set of geometry faces, said assignment of said geometric information is effectuated by, for each vertex of said geometry face, assigning to said each vertex of said geometry face a geometric location of a corresponding vertex of said one of said at least one relevant face.

It is another object of the present invention to disclose the set of instructions as disclosed above, wherein said set of instructions is additionally configured, when executed, to perform at least one of the following:
a. store a number of said at least one relevant face and a location of said at least one relevant face in at least one additional line of said data set;
b. store said color data and said geometry data as either YUV or logarithmic Y'U' V' values;
c. provide said color data comprising a plurality of encoding parameters, each of said plurality of encoding parameters being used in a different portion of said color data;
d. provide said color data comprising a plurality of encoding parameters, each of said plurality of encoding parameters being used in a different portion of said color data;
e. store said geometric data only in the most significant bits of geometric data bytes;
f. select a number of faces in said set of initial faces to be in a range from 10 to $10^6$;
g. select a number of faces in said set of initial faces to be 50,000;
h. provide in metadata in said data set a number of faces in said set of initial faces;
i. select a location of said faces in said set of initial faces from a group consisting of noise, a random number, a fixed location, and any combination thereof, and selecting said fixed location from a group consisting of an origin of a coordinate system and a location outside of said point of view; and
j. assign a single location to unused faces, unused faces being faces in set said of initial faces and not in said set of located faces; and selecting said single location from a group consisting of an origin of a coordinated system and a location outside of said point of view.

It is another object of the present invention to disclose a set of instructions that, when executed, are configured to provide an image, said instructions comprising steps configured to:
acquire a data set comprising color data and, for each frame, a frame number;
acquire geometric data;
generate a set of initial faces;
for each frame:
  determine, from the color data, the frame number;
  determine geometric information of at least one relevant face from said geometric data having said frame number;
  generate a set of geometry faces, each member of said set of geometry faces being a geometry face, each said geometry face corresponding to one of said at least one relevant face; generating said geometry face by assigning said geometric information of said one of said at least one relevant face to one of said set of initial faces, said one of said set of initial faces having said assigned geometric information being said geometry face;
  using said set of geometry faces and said color data, render an image from a predetermined point of view;
wherein geometry of said image and texture of said image are from the same frame of a sequence of frames.

It is another object of the present invention to disclose the set of instructions as disclosed above, additionally configured, when executed, to perform at least one of the following:
a. for each geometry face, effectuate said assignment of said geometric information by, for each vertex of said geometry face, assigning to said each vertex of said geometry face a geometric location of a corresponding vertex of said one of said at least one relevant face;
b. generate said relevant faces in a manner selected from a group consisting of for each relevant frame, after a predetermined time, whenever there is a coherency change in the geometry, and any combination thereof, said predetermined time being in a range from 0.01 s to 10 s
c. select a number of faces in said set of initial faces to be in a range from 1 to $10^6$;
d. select a number of faces in said set of initial faces to be 50,000; and
e. provide a number of faces in said set of initial faces in metadata in said data set.

It is another object of the present invention to disclose the set of instructions as disclosed above, additionally configured, when executed, after said generation of said set of geometry faces, to store said at least one relevant face, thereby generating a set of stored relevant faces, said set of stored relevant faces comprising all of said at least one relevant face.

It is another object of the present invention to disclose the set of instructions as disclosed above, additionally configured, when executed, after said determination of said frame number, to perform at least one of the following:
for each frame in a plurality of frames, determine geometric information of at least one relevant face from said geometric data;
store said geometric information for said plurality of frames;
compare, for said each frame in a plurality of frames, said frame number to a frame number of said each frame in a plurality of frames;
for said frame number being the same as one of said frame number of said each frame in a plurality of frames, select for rendering, from said stored geometric information for said each frame in a plurality of frames, geometric information for said frame number; and
for said frame number not being the same as any of said frame number of said each frame in
a plurality of frames, select for rendering said set of stored relevant faces.

It is another object of the present invention to disclose the set of instructions as disclosed above, additionally configured, when executed, to perform at least one of the following:
a. select a number of said plurality of frames to be in a range from 2 frames to 1001 frames;
b. select a number of said plurality of frames to be in a range from 2 frames to 100 frames,
c. select a number of said plurality of frames to be in a range from 2 frames to 10 frames,
d. select a number of said plurality of frames to be in a range from 2 frames to 5 frames;
e. select a number of said plurality of frames to be in a range from 2 frames to 3 frames;
f. select a number of said plurality of frames to be 3 frames; and
g. select said plurality of frames to comprise a first predetermined number of frames before said frame number and a second predetermined number of frames after said frame number, said first predetermined number of frames being in a range from zero to a first decoder inaccuracy, said second predetermined number of frames being in a range from zero to a second decoder inaccuracy, said first decoder inaccuracy in a range selected from a group consisting of: 0-1 frame 0-2 frames, and 0-500 frames, said second decoder inaccuracy in a range selected from a group consisting of: 0-1 frame 0-2 frames, and 0-500 frames.

It is another object of the present invention to disclose the set of instructions as disclosed above, additionally configured, when executed, to select a location of said faces in said set of initial faces from a group consisting of noise, a random number, a fixed location, and any combination thereof.

It is another object of the present invention to disclose the set of instructions as disclosed above, additionally comprising a step of selecting said fixed location to be an origin of a coordinate system.

It is another object of the present invention to disclose the set of instructions as disclosed above, additionally configured, when executed, to assign a single location to unused faces, unused faces being faces in set said of initial faces and not in said set of located faces.

It is another object of the present invention to disclose the set of instructions as disclosed above, additionally configured, when executed, to select said single location from a group consisting of an origin of a coordinate system and a location outside of said point of view.

BRIEF DESCRIPTION OF THE FIGURES

In order to better understand the invention and its implementation in practice, a plurality of embodiments will now be described, by way of non-limiting example only, with reference to the accompanying drawings, wherein
FIG. 1 schematically illustrates a flow chart of the prior art.

DETAILED DESCRIPTION OF THE PREFERRED EMBODIMENTS

Figure 1:
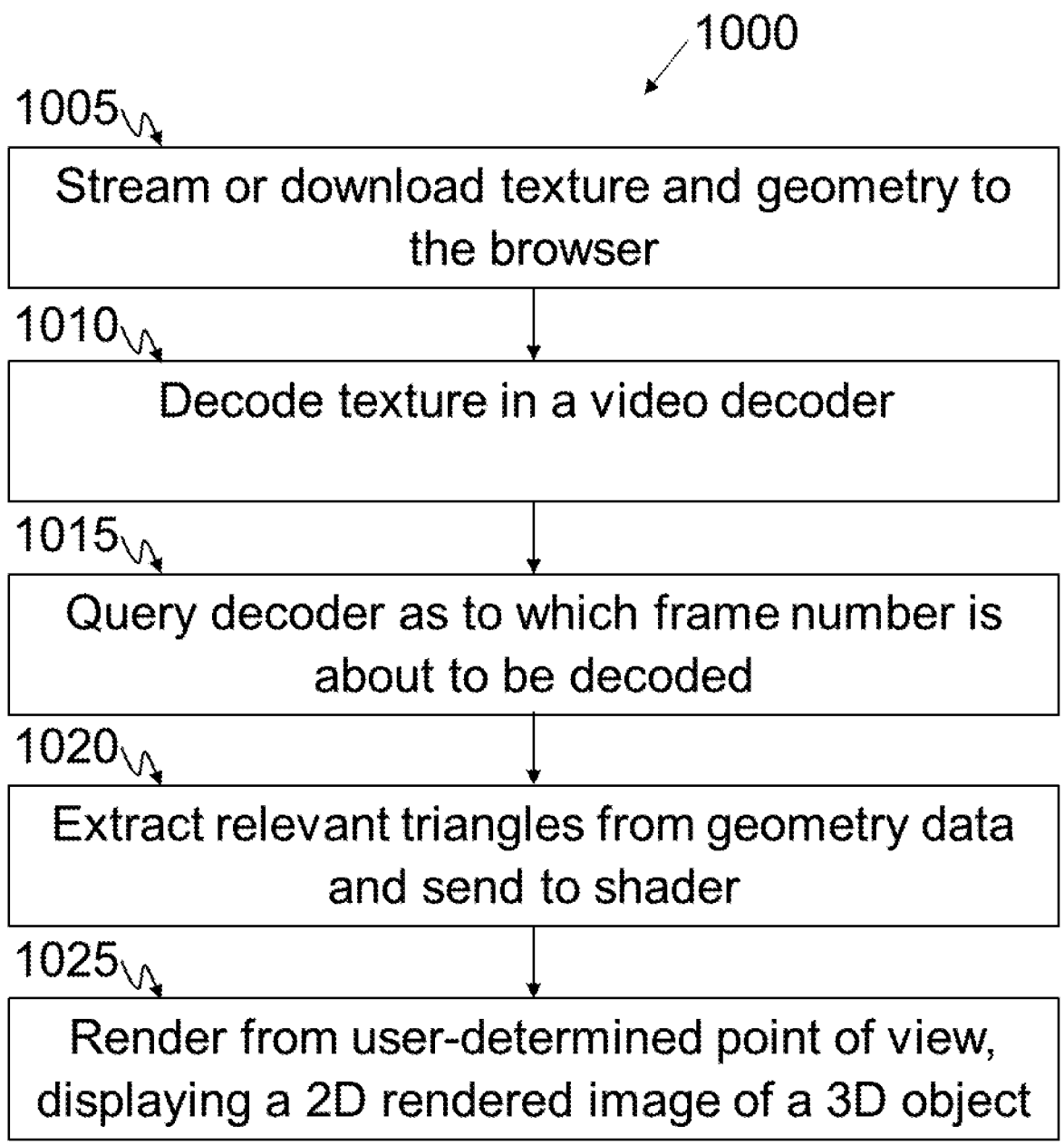

The following description is provided, alongside all chapters of the present invention, so as to enable any person skilled in the art to make use of said invention and sets forth the best modes contemplated by the inventor of carrying out this invention. Various modifications, however, will remain apparent to those skilled in the art, since the generic principles of the present invention have been defined specifically to provide a means and method for ensuring a match between geometry and texture when playing volumetric videos in a web browser.

The term 'data set' hereinafter refers to a set of data which can be downloaded. As used herein, a data set contains at least one of texture data, geometry data, audio data and metadata. Typically, a data set will contain both texture data and geometry data as well as audio data and can, but does not necessarily, contain metadata.

The term 'color data' hereinafter refers to colors in a data set. Each color datum is typically a pixel in a 2D mapping; typically, the 2D mapping comprises a texture atlas, however, the type of mapping is not relevant to the methods disclosed herein.

The term 'face' or 'geometry face' hereinafter refers to a smallest useful area on a model. A complete set of faces describes the geometry of the model. Faces are most commonly triangles, less commonly quadrilaterals, and can be any desired planar geometrical shape. A face can comprise one or more colors.

The term 'geometry data' hereinafter refers to the geometric data in a data set. The geometry data typically comprise the locations of vertices of faces, with a link between the 3D geometric location in a 3D model of the vertex and the 2D location of the vertex in a 2D atlas, where the atlas stores the color information. Geometry data are typically stored as (location in 3D) and (location on a conformal or other 2D atlas). One typical method of storing geometry data is XYZ UV, where (x,y,z) is the location of the datum in 3D space, while (u,v) is the location of the datum in the 2D atlas. Each geometry datum can comprise a vertex number. In some embodiments of storage methods, after a location is given for a vertex, the vertex number can be stored instead of the (x,y,z) location, thereby reducing the size of the data set to be stored.

The term 'geometry information' hereinafter refers to the information describing the geometry of the model. Geometry information typically includes the locations on the model of the vertices of the faces, a mapping of the mesh vertices to the atlas pixels, and the faces to which each vertex belongs.

The term 'color information' hereinafter refers to the color of a pixel in an atlas as applied on the model. From the geometry data, the color datum for each pixel in the atlas can be used to color a 3D model. For each pixel in the atlas (of constant size), the size and 3D shape on the 3D model of the area colored by the pixel is generated from the geometry information. No geometry information is stored in the atlas.

It is often desired to play a volumetric (3D) video on a web browser. However, web browsers can have limited bandwidth, the computer the browser is running on can have limited CPU and GPU, and the computer processor, the browser, the memory or some combination thereof can limit the amount of CPU or GPU available to the browser. In addition, it is preferable to use the video decoder available to the browser, so that no plugin or other additional software is needed for generating the display. Therefore, it can be difficult to ensure high-quality volumetric video when played in a web browser. The most typical problem is mismatch between the texture frame being displayed and the mesh frame being displayed, causing the displayed images to look ragged or have the wrong texture (color). The present invention provides systems to overcome this problem.

Typically, devices configured to display images have, in addition to a main processor for general computation, dedicated graphics processing. The main processor is commonly referred to as a CPU, as will be used herein. The graphics processing can be software-enabled or hardware-enabled. Herein, the graphics processing, whether hardware or software enabled, will be referred to as GPU.

Typically, the number of geometry faces to be rendered and their location is specified in CPU, although the location can be edited in GPU.

It should be noted that which functions are executed in CPU and which in GPU is somewhat device-dependent, as mobile devices tend to execute more of the functions in GPU.

In order to display the images, typically, there are a minimum of two types of information in a volumetric video:
  Color, which is usually stored as compressed video (color data).
  Geometry, which is a description of where the 3D model faces are located in 3D space and their location in a 2D texture atlas. Geometry is usually stored as vertex locations in 3D space and in the 2D texture atlas (geometry data). Typically, the geometric data are stored as a list of vertex locations and a list of the vertices belonging to each face. Typically, the vertex index number is inferred from the order of the vertices as stored in the geometric data, although other storage systems are possible and the system of the present invention is not limited by the type of storage system for geometric data. A non-limiting example of storage of geometric data is shown below. In the non-limiting example below, each $Face_a Vertex_b$ is the index number of a vertex in the list of vertices. If all the faces are triangles, then for each face there will be three vertices; $Face_a Vertex_{last}$ will always be $Face_a Vertex_{third}$ Number of vertices $N$, $x_1 y_1 z_1 u_1 v_1$, $x_2 y_2 z_2 u_2 v_2$, $x_3 y_3 z_3 u_3 v_3$, $\vdots$ $x_N y_N z_N u_N v_N$ Number of faces $F$ $Face_1 Vertex_{first} Face_1 Vertex_{second} \ldots Face_1 Vertex_{last}$ $Face_2 Vertex_{first} Face_2 Vertex_{second} \ldots Face_2 Vertex_{last}$ $Face_3 Vertex_{first} Face_3 Vertex_{second} \ldots Face_3 Vertex_{last}$ $\vdots$ $Face_F Vertex_{first} Face_F Vertex_{second} \ldots Face_F Vertex_{last}$ It is possible for a vertex $x_m y_m z_m$ to be mapped to more than one location in the atlas, for non-limiting example, to both $u_j v_j$ and $u_k v_k$, for example, when the two faces that share the vertex $x_m y_m z_m$ map to different areas in the atlas. In that case, typically, the location $x_m y_m z_m$ will occur more than once in the list of vertices, once as $x_m y_m z_m u_j v_j$ and once as $x_m y_m z_m u_k v_k$. The system of the present invention is not limited by the method of mapping locations $x_m y_m z_m$ to atlas pixels $u_j v_j$ Typically, the volumetric video also comprises audio data. Other information, which may or may not be present, is typically referred to as metadata. Metadata can comprise, but is not limited to, a date stamp, a time stamp, an authentication, a validity certificate, a passcode, a reference number, and any combination thereof. Except as detailed herein, the presence of metadata and the nature of the metadata, if present, do not limit the invention disclosed herein.

Typically, in the prior art, as shown in FIG. 1, the steps involved in generating (1000) the textured volumetric video comprise:
  1) The color data are streamed or downloaded to the browser (1005).
  2) The color data are decoded in a video decoder (1010). Typically, the decoder is in the GPU.
  3) The CPU queries the decoder as to which frame number is about to be decoded (1015).
  4) The geometry data are streamed or downloaded and the number of relevant faces and the location of each relevant face are extracted from the geometry data and sent to the GPU (1020).
  5) Rendering takes place from the relevant point of view, since the browser displays a 2D rendering of a 3D object from a user-determined point of view (1025).
  This process will be called the "standard process".

However, at step 3, in practice, very often the decoder reports the wrong frame number or a referenced frame (either previous or subsequent) is corrupted or is not in buffer.

Typically, compression methods for color information are designed to minimize the file size while keeping the aesthetics of the displayed color as close as possible to the original esthetics, minimizing loss of color quality. However, color data are typically stored as color values, while geometry data are typically stored, as described above, as vertex location and, for each face, the vertices that describe that face.

In the standard process, although good compression of both geometry and color is possible, synchronization of the color frame with the geometry frame can be unreliable. The present invention discloses two methods of ensuring synchronization of color frame with geometry frame. Both methods have more than one embodiment. In one method, geometry is stored as texture; in the other method, the frame number is stored, for each frame, in the color data.

In the first method, the file comprises both geometry data and color data, with the geometry data encoded in a texture data format. The color data and geometry data can then be compressed using a single compression format while keeping the file size small, thus improving download speeds and keeping a reasonable geometric quality.

In the second method, discussed below, only the frame number is encoded in a texture data format.

There are a number of techniques that can be used to reduce the size of a file comprising geometry data and color data and also to store the geometry data in a texture data format.

Therefore, with the standard process, with color data and geometry data both saved in the standard manner, compression of the geometry data is difficult. If one set of compression parameters were to be used for both types of data, if lossless compression were to be used, geometric quality would be preserved but the stored file would be large. If, on the other hand, lossy compression were to be used, the file size would be much reduced but the geometric quality of the rendered image would be degraded, probably severely.

The typical techniques currently used for video compression are H.264 and H.265, which typically use a type of Fourier transform, such as, but not limited to, integer discrete cosine transform (DCT) to compress the color data. In general, for Fourier transforms, only the amplitudes of the transform need to be stored, reducing file size. In DCT, the high-frequency components of the transform are removed or de-emphasized. This tends not to strongly affect texture quality, as the high-frequency color data are frequently noise. After downloading, the decoder back-transforms the data.

Typically, in storing color information, the color value for each location is converted from RGB or logarithmic R'G'B' (red, green blue) color values to YUV or logarithmic Y'U'V' color values, where Y is the luminance (Y'=luma), U, the first chroma value, is B–Y (U'=B'–Y'), B being the blue value in RGB space and V, the second chroma value, is R–Y (V'=R'–Y'), R being the red value in RGB space. For simplicity, the color spaces (and respective color values) will be referred to as RGB and YUV hereinafter.

To reduce file size, color values can be subsampled so that, for each location, only two of the YUV channels are stored, the two channels being, first, the Y channel (always stored) and, second, either the U channel or the V channel.

The subsampling scheme is typically expressed as a three-part ratio J:a:b (e.g. 4:2:2) that describes the number of luminance and chrominance samples in a conceptual region that is J pixels wide and 2 pixels high. The parts are (in their respective order):

J: horizontal sampling reference (width of the conceptual region).
a: number of chrominance samples (U, V) in the first row of J pixels.
b: number of changes of chrominance samples (U, V) between first and second row of J pixels.

Normally, b is either zero or equal to a, except for irregular cases like 4:4:1 and 4:2:1, which do not follow the convention.

If there is no subsampling and all color values are stored, this is typically referred to as 4:4:4 sampling.

For non-limiting example, in 4:2:2 subsampling, for each color datum, the two values that are stored are Y and one of U or V, with U and V being stored in alternate color data, in the order UV in a first line and VU in a second line. On decoding, the "missing" value is generated by averaging the values from the adjacent color data. In 4:2:2 subsampling, if a given color datum has Y and U stored, the V value can be generated from an average of the V values of the color data surrounding the given color datum. Obviously, the same will hold for generating the U value of a color datum with stored V value. Other typical subsampling schemes are 4:4:2 and 4:2:0. The subsampling scheme that is used depends on the amount of compression desired and the quality of the texture desired; greater compression leads to greater loss of detail in the rendered color.

When geometry data are stored in a texture format, subsampling can cause significant damage to the accuracy of the rendered image because of the lack of a relationship between the information stored in adjacent locations since, typically, geometry data are stored as, for non-limiting examples, face number, vertex location and vertex-to-vertex connections between faces or as face number and vertex number plus location of the vertex for each vertex in the face.

In one technique, in order to avoid loss of geometric information during subsampling, all of the geometry data are stored only in the Y channel, which is not subsampled.

In another technique, where the encoder is lossy, least significant bit (LSB) data are lost during encoding, so important data are stored in the most significant bits (MSB). Typically, the first 5 bits of a byte are the MSB, the last three bits being discarded. In encoding schemes of this type, file data alternate between (or comprise separate blocks of) color data and geometry data stored in texture data format. The MSB for all of the pixels comprise Y data. The texture data comprise YUV channels, and, as above, for the geometry data, the geometric information is encoded in the Y channel only. Therefore, when lossy compression is used, discarding LSB data, the geometric information is not degraded. In a first embodiment, the geometry for each frame is embedded with the relevant color data. Extra lines of file data comprise the number and location of the geometry faces.

In another technique, different compression parameters are used for different parts of the image. For non-limiting example, regions of interest are compressed less than other regions. A region of interest can be the geometry; geometry data are compressed less than color data. Typically, although not necessarily, a region of interest is the bottom of the image; it is very common for an image to have the background in its upper part while the foreground is in the lower part. Therefore, it is common to compress the lower part of an image less than the upper part of the image.

It should be noted that any combination of the above techniques can be used for compression.

It should further be noted that the system of the present invention is not limited by the above techniques for compression.

In another technique, synchronization of geometry and texture is ensured by storing the geometry data and color data separately, but storing a frame number in the color data to ensure synchronization of color and geometry. With this technique, a frame number is encoded in the color data. For non-limiting example, one or more of the first file locations of the color data can contain a frame number instead of a texture value.

Variants of this embodiment, discussed more fully below, include:
1. The frame number is decoded in the GPU and transmitted to the CPU so that the CPU knows the frame number, thus replacing the decoder's inaccurate "what is the current frame" application programming interface (API) in the CPU.
2. A large number of initial faces, typically triangles, can be generated in the CPU. In the GPU, knowing the frame number, a subset of the initial faces is filled with the appropriate geometry.
3. If there is sufficient memory available, geometry can be decoded for a number of frames and stored in memory. Then, as above, initial faces, typically triangles, are generated in the CPU. The frame number is extracted from the color data and, in the GPU, the geometry faces (a subset of the initial faces) are filled with the appropriate geometry for that frame number, the geometry information retrieved from the stored geometry.
4. If the memory is likely to be limited, geometry is decoded for a few frames in the neighborhood of the expected frame and stored in memory. The texture and its embedded frame number are decoded. The frame number of the texture is compared to the frame numbers of the stored geometry. If there is a match between a frame number for the stored geometry and the frame number of the texture, as above, the geometry faces (a subset of the initial faces) are filled with the appropriate geometry for that frame number, and the geometry and texture are rendered. The rendered image is stored in a buffer. If, for a frame, no match is found between frame number for the stored geometry and frame number of the texture, the textured image stored in buffer is reused. This can reduce the bit rate slightly, but preserves the image quality.

In the first embodiment, the geometry is encoded for each frame inside the relevant texture. A few more lines of file data are added and the number and location of the geometry faces are stored in the extra lines of file data.

Figure 2:
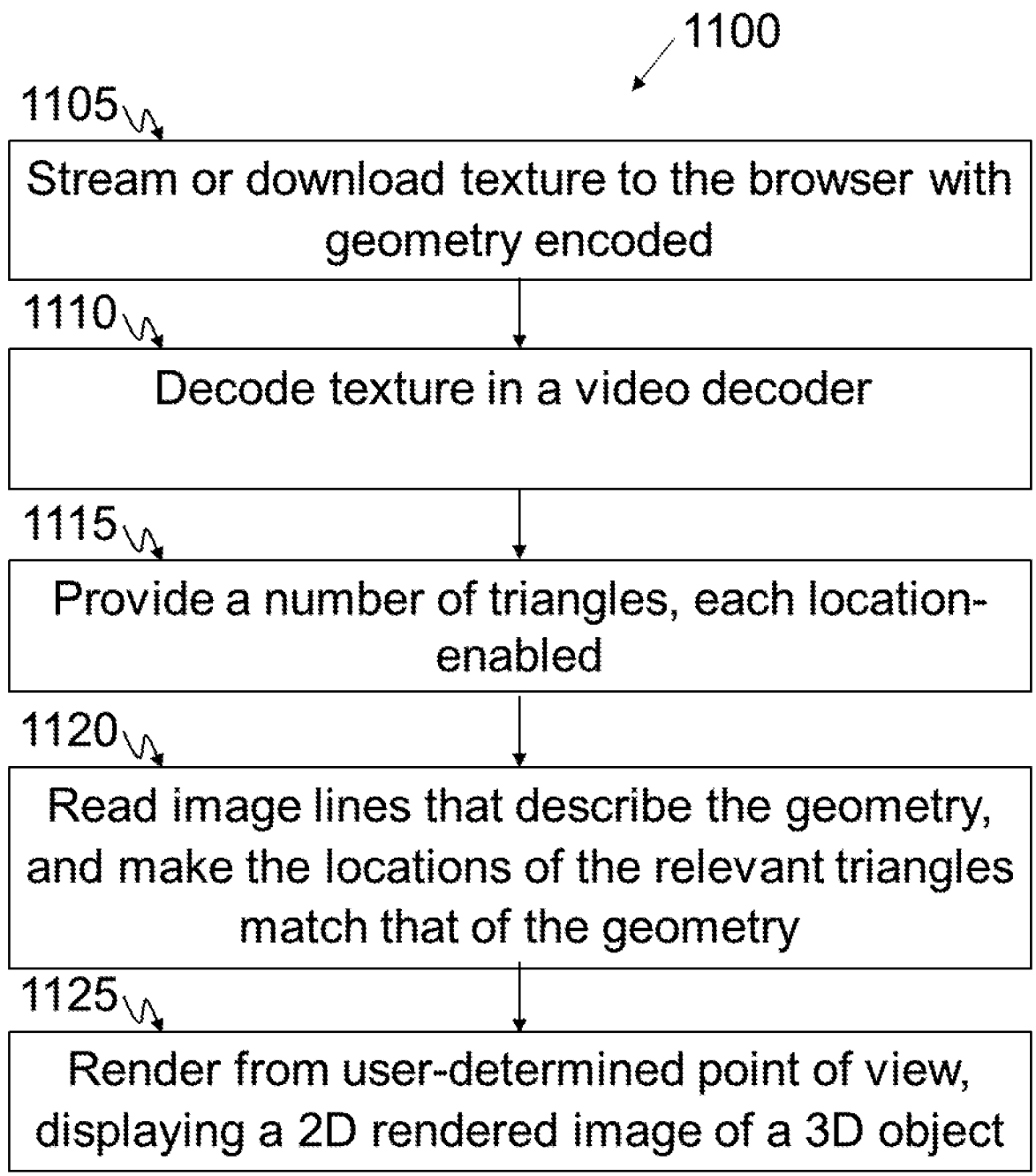
FIG. 2 schematically illustrates a flow chart of an embodiment of the present invention.

As shown in FIG. 2, the first embodiment (1100) of the method comprises steps of:
1) Color data and geometry data are streamed or downloaded to the browser (1105).
2) Texture is decoded in a video decoder (1110) to determine the color information. Typically, the decoder is in the GPU.
3) A large enough number of faces is generated (1115). The number of faces can be sent as metadata or a predetermined number, chosen to be large enough, is used. All of the faces have an irrelevant location. The "location" can be noise or a fixed location such as (0,0,0); the value does not matter since a correct value will be entered at a later step. The number of faces generated is not limiting. Typically, it will be about 50,000. It can be in a range from 1 to $10^6$.
4) In the GPU, the extra lines of file data comprising geometry data are read (1120), from which the geometry information can be determined. For each relevant face, its actual location is assigned to one of the faces generated at step 3. If more faces were generated at step 3 than there are relevant faces, the unneeded faces are assigned a single location, which can be (0,0,0) or a location known to be outside of the rendering view. These unneeded faces are then in a degenerate state.
5) Rendering takes place from the relevant point of view (1125), since the browser displays a 2D rendering of a 3D object from a user-determined point of view.

Since, in this solution, the relevant geometry data and the color data are stored in the same frame there is no need to query the encoder and so there is no possibility of mismatch in the rendering.

In the second embodiment of the method, the frame number is encoded in the color data. A first variant and second variant, with two sub-variants, are given.

In the first variant of the second embodiment of the method, steps 1 and 2 are the same as in the standard process.

The standard step 3 is then replaced, as shown below, by steps that result from using the frame number that was decoded from the data set.

Figure 3:
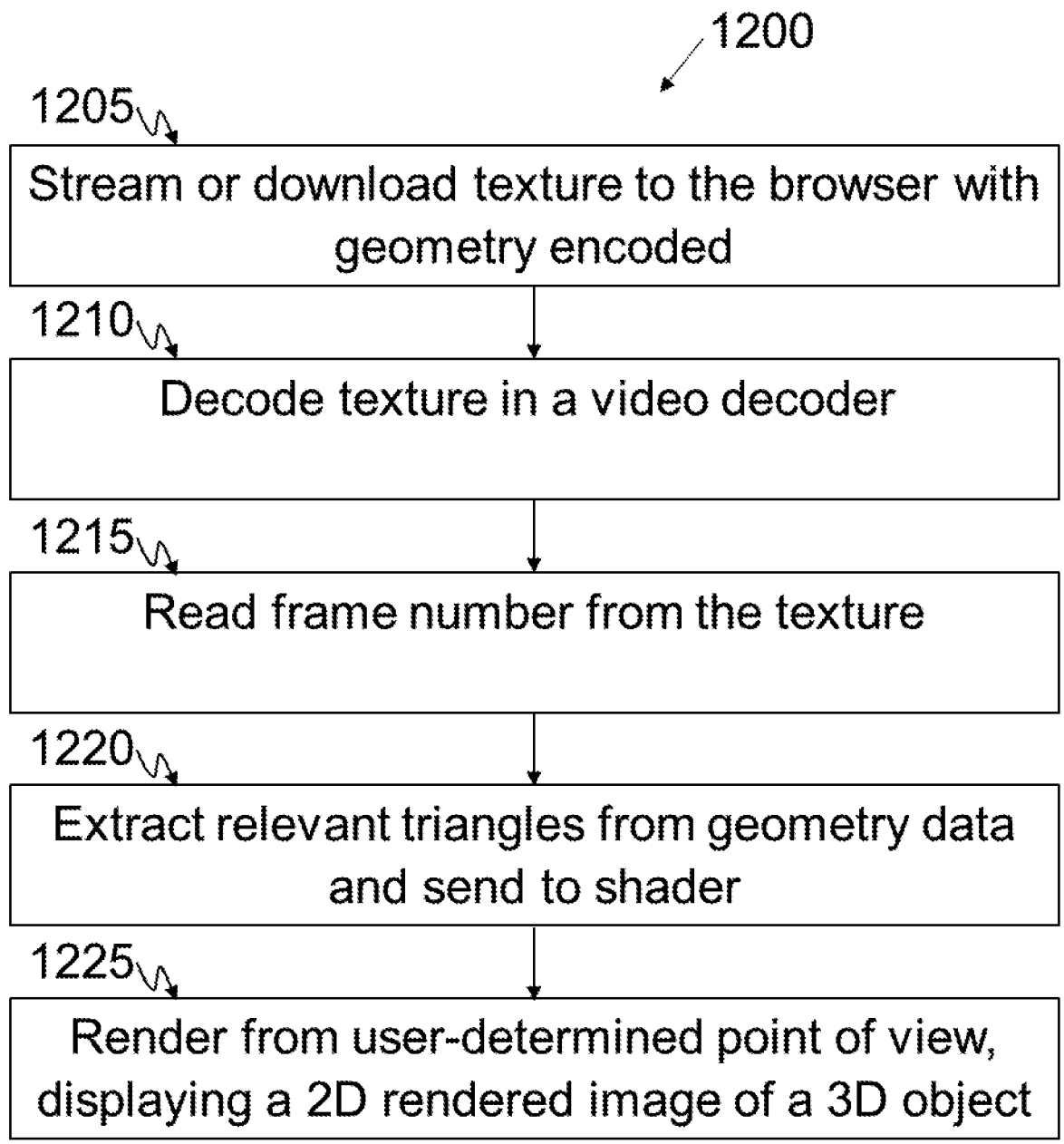
FIG. 3 schematically illustrates a flow chart of an embodiment of the present invention.

As shown in FIG. 3, the first variant of the second embodiment of the method (1200) comprises steps of:
1) A data set is streamed or downloaded to the browser (1205).
2) The data set is decoded in a video decoder (1210) to determine the color data. Typically, the decoder is in the GPU.
3) In the GPU, the frame number (embedded in the color data, as described above) is read (1215) and sent to the CPU.
4) The geometry data are decoded and the number of relevant faces and the location of each relevant face are extracted from the geometry data and sent to the GPU, (1220).
5) Rendering takes place from the relevant point of view (1225), since the browser displays a 2D rendering of a 3D object from a user-determined point of view.

In the second variant of the second embodiment of the method, the relevant geometry data are downloaded and stored in accessible GPU memory by generating a degenerate pool of faces, as described in step 3 of the standard method, and the actual geometry, by changing locations to actual locations, is applied to a subset of the degenerate pool of faces, as described in step 4 of the standard method.

Two sub-variants are shown, which differ in the amount of geometry data stored. In the first sub-variant, geometry data are stored for a large number of frames ("large memory"); in the second sub-variant, geometry data are stored for only a small number of frames ("small memory"), the number of frames being sufficient only to cover decoder frame inaccuracy. For non-limiting example, if the decoder is accurate to within plus or minus one frame, only three frames need be stored; accuracy to within plus one or minus two frames means four frames need to be stored, and so on. Non-limiting examples of the number of the number of frames stored are from 2 to 1000, from 2 to 100, from 2 to 10, from 2 to 4 and from 2 to 3.

Figure 4:
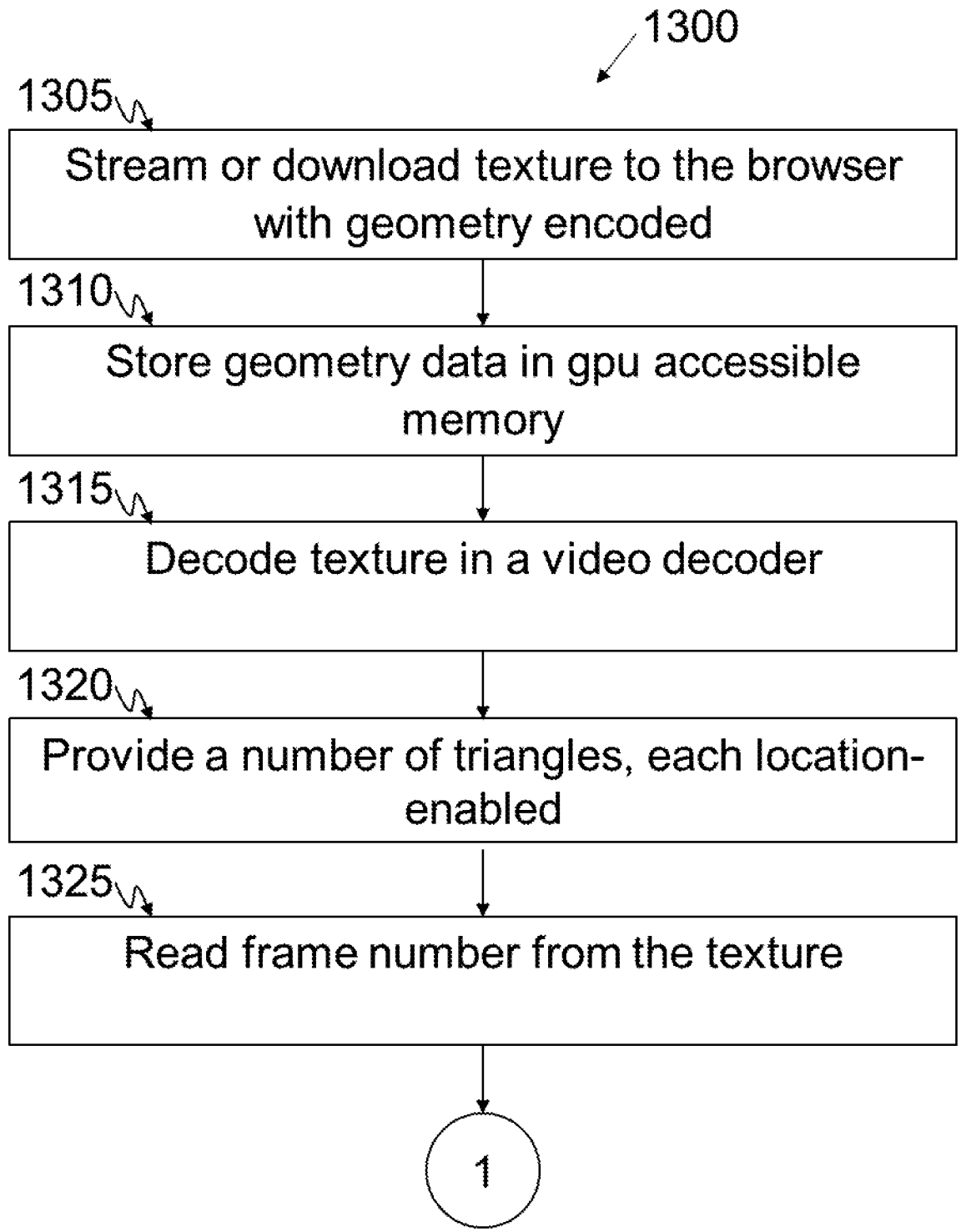
FIGS. 4-5 schematically illustrate a flow chart of an embodiment of the present invention.
Figure 5:
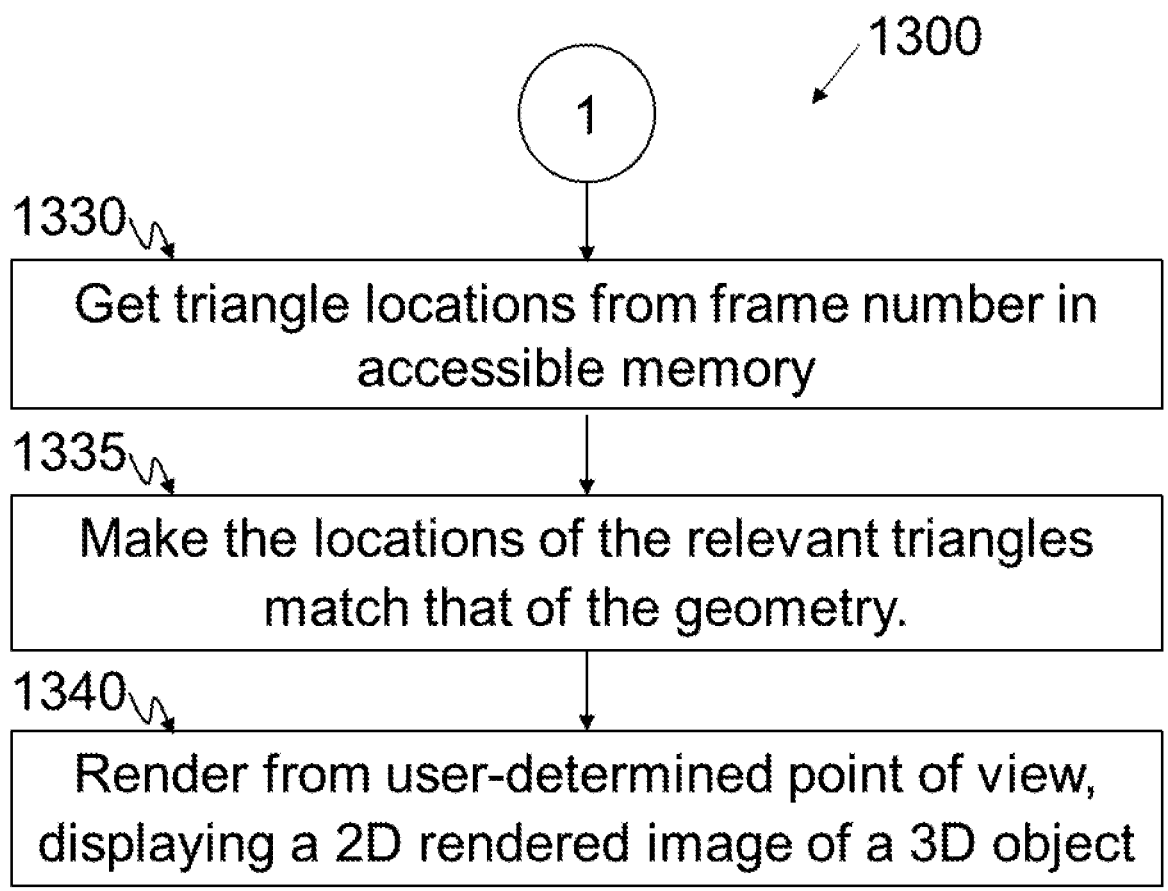

As shown in FIGS. 4 and 5, the first sub-variant (1300) of the second variant of the method comprises steps of:
1) Color data are streamed or downloaded to the browser (1305).
2) Geometry data are streamed or downloaded and stored in GPU accessible memory (1310).
3) Color data are decoded in a video decoder (1315) to determine the color information. Typically, the decoder is in the GPU.
4) A large enough number of faces is generated (1320). The number of faces can be sent as metadata or a predetermined number, chosen to be large enough, is used. All of the faces have an irrelevant location. The "location" can be noise or a fixed location such as (0,0,0); the value does not matter since a correct value will be entered at a later step. The number of faces generated is not limiting. Typically, it will be about 50,000. It can be in a range from 1 to $10^6$.
5) In the GPU, the frame number, stored in the color data, is read (1325).
6) In the GPU, the frame number is used to get the locations of the relevant faces from accessible memory (1330).
7) In the GPU, for each relevant faces, its actual location is assigned (1335) to one of the faces generated at step 4. If more faces were generated at step 4 than there are relevant faces, the unneeded faces are assigned a single location, which can be (0,0,0) or a location known to be outside of the rendering viewpoint. These unneeded faces are then in a degenerate state.
8) Rendering takes place from the relevant point of view (1340), since the browser displays a 2D rendering of a 3D object from a user-determined point of view.

Figure 6:
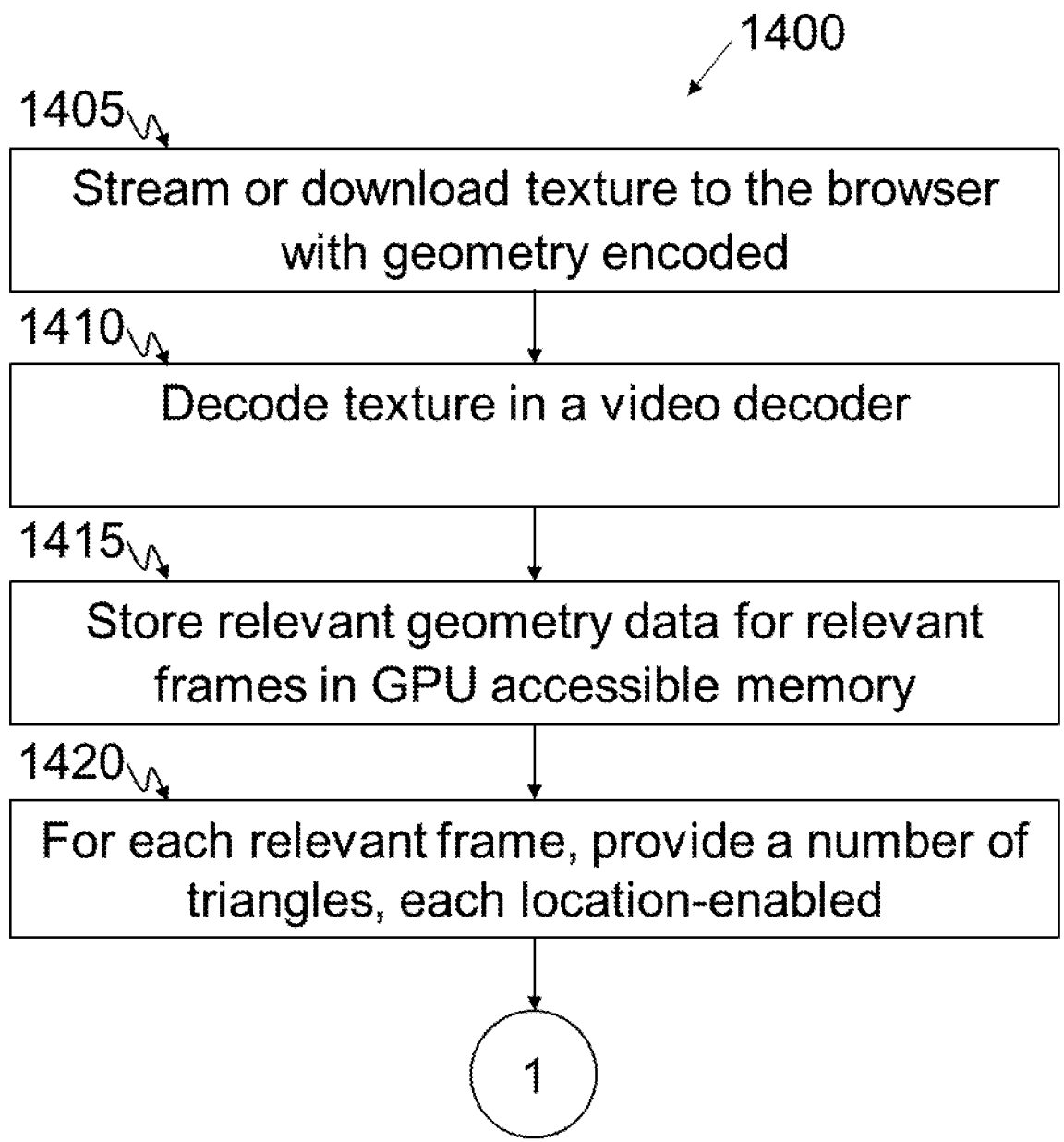
FIGS. 6-7 schematically illustrate a flow chart of an embodiment of the present invention
Figure 7:
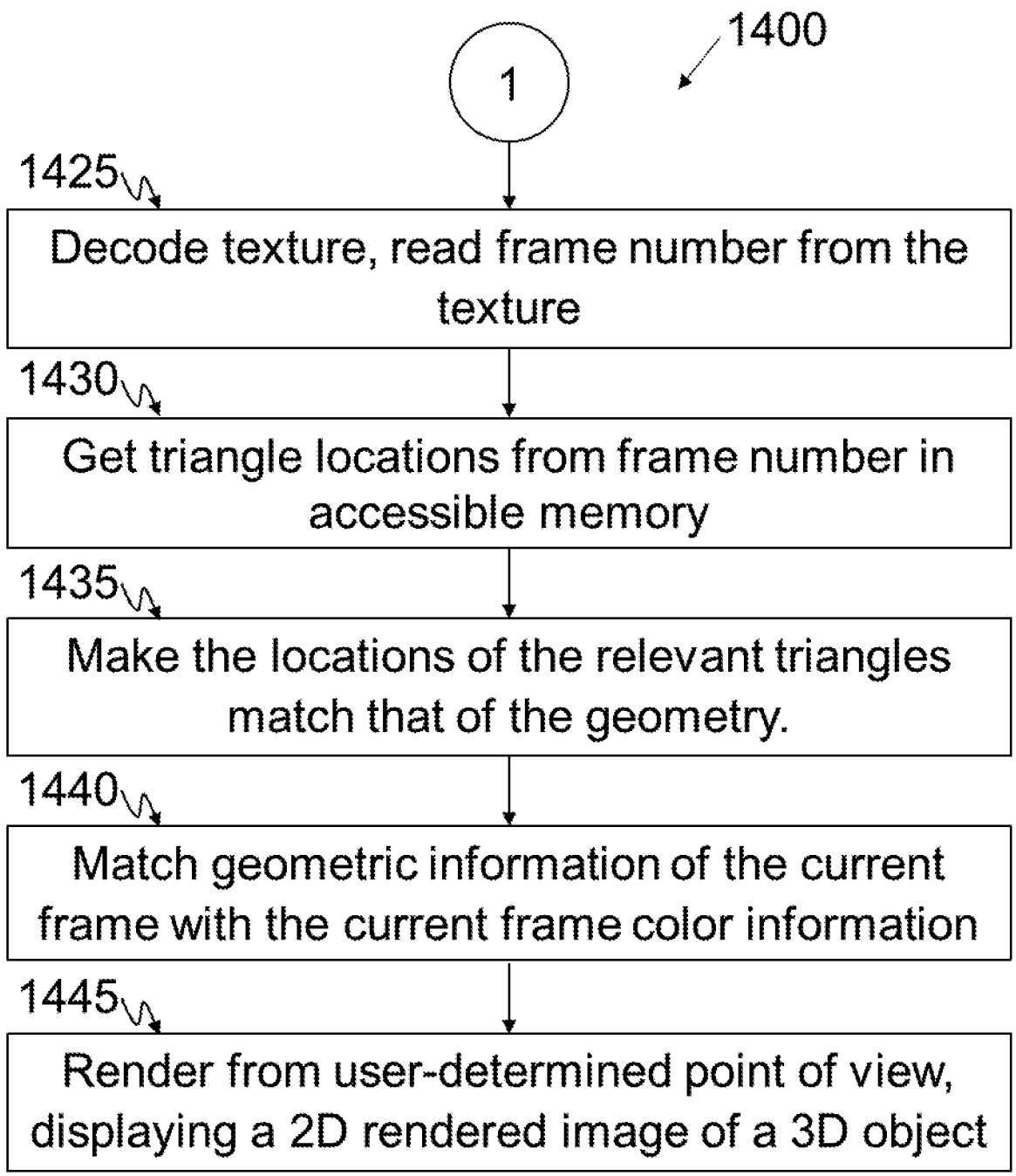

As shown in FIGS. 6 and 7, the second sub-variant (1400) of the second variant of the method comprises steps of:
1) The data set is streamed or downloaded to the browser (1405).
2) Color data are decoded in a video decoder (1410) to determine the color information. Typically, the decoder is in the GPU.
3) The relevant geometry information is copied to GPU accessible memory (1415) for all the relevant frames, the relevant frames being the frame of the current frame number and the frames for the frame numbers covering the estimated decoder inaccuracy.

4) A large enough number of faces is generated (1420). The number of faces can be sent as metadata or a predetermined number, chosen to be large enough, is used. All of the faces have an irrelevant location. The "location" can be noise or a fixed location such as (0,0,0); the value does not matter since a correct value will be entered at a later step. The number of faces generated is not limiting. Typically, it will be about 50,000. It can be in a range from 1 to $10^6$.

In some embodiments, faces are generated for each relevant frame. In some embodiments, faces are generated once for each predetermined time; for non-limiting example, faces could be generated every second. In some embodiments, faces are generated whenever there is a coherency change in the geometry. Typically, the locations of the faces (see below) are changed for each frame.

5) In the GPU, color data are decoded and the current frame number, encoded in the data set, is read (1425).

6) In the GPU, the current frame number is used to get the locations of the relevant faces from accessible memory (1430).

7) In the GPU, for each relevant face in each relevant frame, the relevant face's actual location is assigned (1435) to one of the faces generated for the relevant frame at step 4. If more faces were generated at step 4 than there are relevant faces, the unneeded faces are assigned a single location, which can be (0,0,0) or a location known to be outside of the rendering viewpoint. These unneeded faces are then in a degenerate state.

8) In the GPU, the geometric information of the current frame is matched with the current frame color information (1440).

9) Rendering takes place from the relevant point of view (1445), since the browser displays a 2D rendering of a 3D object from a user-determined point of view.

If the decoder inaccuracies are larger than expected and, for a particular frame, the relevant geometry is not in the GPU accessible memory the second variant is modified by adding steps between step 6 and step 7:

6.1) If the current frame number matches the frame number of one of the relevant frames, those with geometry information stored in GPU at step 4, proceed to step 7.

6.2) If the current frame number does not match the frame number of any of the relevant frames, those with geometry stored in GPU at step 4, then the geometry information that was used for the most recent render is re-used and the process continues at step 9, the number of relevant faces and the location of each relevant face are extracted from the geometry information, and the process is completed with step 10, with the rendering taking place from the relevant point of view.

This modification causes the frame rate to drop momentarily, since the same frame has been rendered twice, but there are no artifacts.

The invention claimed is:

1. A processor-implemented method for providing an image in a volumetric video, comprising steps of:
generating a set of initial faces;
acquiring a data set comprising both color data and geometric data, said geometric data comprising a set comprising at least one relevant face;
determining, from said geometric data, geometric information for said at least one relevant face, said geometric information comprising locations of vertices of said at least one relevant face;
generating from said set of initial faces a set comprising at least one geometry face, each of said at least one geometry face generated by assigning to one of said set of initial faces said geometric information for said at least one relevant face; and
rendering an image from a point of view using said set comprising at least one geometry face and said color data;
wherein at least one of the following is true:
a. for each of said at least one geometry face, said step of assigning said geometric information is effectuated by, for each vertex of said at least one geometry face, assigning to said each vertex of said at least one geometry face a geometric location of a corresponding vertex of said at least one relevant face;
b. said at least one relevant face is generated in a manner selected from the group consisting of for each relevant frame, after a predetermined time, whenever there is a coherency change in the geometry, and any combination thereof, said predetermined time being in a range from 0.01 s to 10 s;
c. selecting a number of faces in said set of initial faces to be in a range from 1 to $10^6$;
d. selecting a number of faces in said set of initial faces to be 50,000; and
e. providing a number of faces in said set of initial faces in metadata in said texture data set.

2. The processor-implemented method of claim 1, wherein, for each of said set comprising at least one geometry face, said step of assigning said geometric information is effectuated by, for each vertex of said geometry face, assigning to said each vertex of said geometry face a geometric location of a corresponding vertex of said one of said at least one relevant face.

3. The processor-implemented method of claim 1, additionally comprising at least one of the following steps:
a. storing a number of said at least one relevant face and a location of said at least one relevant face in at least one additional line of said data set;
b. storing said color data and said geometric data as either YUV or logarithmic Y'U'V' values;
c. providing said color data comprising a plurality of encoding parameters, each of said plurality of encoding parameters being used in a different portion of said color data;
d. said geometric data being stored only in the most significant bits of geometric data bytes;
e. selecting a number of faces in said set of initial faces to be in a range from 10 to $10^6$;
f. selecting a number of faces in said set of initial faces to be 50,000;
g. providing in metadata in said data set a number of faces in said set of initial faces;
h. selecting a location of said faces in said set of initial faces from the group consisting of noise, a random number, a fixed location, and any combination thereof, and selecting said fixed location from the group consisting of an origin of a coordinate system or a location outside of said point of view; and
i. assigning a single location to unneeded faces, unneeded faces being faces in said set of initial faces and not in said set comprising at least one geometry face; and selecting said single location from the group consisting of an origin of a coordinated system or a location outside of said point of view.

4. A processor-implemented method for providing an image, in a volumetric video comprising steps of:
generating a set of initial faces;
acquiring a texture data set comprising color data and, for each frame, a texture frame number, said texture frame number being stored in said texture data set;
acquiring a geometry data set comprising geometric data, said geometric data comprising a set comprising at least one relevant face, a geometry frame number of said geometry data being stored in said data set comprising geometric data;
for each frame:
determining the geometry frame number;
determining, from said geometric data in said geometry data set having said geometry frame number, geometric information for said at least one relevant face, said geometric information comprising locations of vertices of said at least one relevant face;
generating from said set of initial faces a set comprising at least one geometry face, each of said at least one geometry face generated by assigning to one of said set of initial faces said geometric information for said at least one relevant face; and
using said set comprising at least one geometry face and said color data, rendering an image from a predetermined point of view;
wherein at least one of the following is true:
a. for each of said at least one geometry face, said step of assigning said geometric information is effectuated by, for each vertex of said at least one geometry face, assigning to said each vertex of said at least one geometry face a geometric location of a corresponding vertex of said at least one relevant face;
b. said at least one relevant face is generated in a manner selected from the group consisting of for each relevant frame, after a predetermined time, whenever there is a coherency change in the geometry, and any combination thereof, said predetermined time being in a range from 0.01 s to 10 s;
c. selecting a number of faces in said set of initial faces to be in a range from 1 to $10^6$;
d. selecting a number of faces in said set of initial faces to be 50,000; and
e. providing a number of faces in said set of initial faces in metadata in said texture data set.

5. The processor-implemented method of claim 4, additionally comprising a step after said step of generating said set comprising at least one geometry face, said step comprising storing said at least one relevant face in a set of stored relevant faces.

6. The processor-implemented method of claim 5, additionally comprising the following steps, after said step of determining said geometry frame number:
for a first each frame in a plurality of frames,
determining each-frame geometric information of said at least one relevant face from said geometry data; and
storing a number of said first each frame as an each-frame geometry frame number and said each-frame geometric information;
for a second each frame in a plurality of frames,
comparing said texture frame number to said each-frame geometry frame number;
for said texture frame number being the same as one of said each-frame geometry frame number, selecting for rendering geometric information for said one of said each-frame geometry frame number; and
for said texture frame number not being the same as any of said each-frame geometry frame number, selecting for rendering said set of stored relevant faces.

7. The processor-implemented method of claim 6, additionally comprising one of the following steps:
a. selecting a number of said plurality of frames to be in a range from 2 frames to 1001 frames;
b. selecting a number of said plurality of frames to be in a range from 2 frames to 100 frames,
c. selecting a number of said plurality of frames to be in a range from 2 frames to 10 frames,
d. selecting a number of said plurality of frames to be in a range from 2 frames to 5 frames;
e. selecting a number of said plurality of frames to be in a range from 2 frames to 3 frames;
f. selecting a number of said plurality of frames to be 3 frames; and
g. selecting said plurality of frames to comprise a first predetermined number of frames before said frame number and a second predetermined number of frames after said frame number, said first predetermined number of frames being in a range from zero to a first decoder inaccuracy, said second predetermined number of frames being in a range from zero to a second decoder inaccuracy, said first decoder inaccuracy in a range selected from the group consisting of: 0-1 frame 0-2 frames, and 0-500 frames, said second decoder inaccuracy in a range selected from the group consisting of: 0-1 frame 0-2 frames, and 0-500 frames.

8. The processor-implemented method of claim 4, additionally comprising a step of selecting a location of said faces in said set of initial faces from the group consisting of noise, a random number, a fixed location, and any combination thereof, said fixed location selected from the group consisting of an origin of a coordinate system or a location outside of said point of view.

9. The processor-implemented method of claim 4, additionally comprising a step of assigning a single location to unneeded faces, unneeded faces being faces in said set of initial faces and not in said set comprising at least one geometry face; said single location selected from the group consisting of an origin of a coordinate system or a location outside of said point of view.

10. A non-transitory processor-readable medium storing code representing instructions to be executed by a processor, the code comprising code to cause the processor to provide an image in a volumetric video, said program comprising steps configured to:
generate a set of initial faces;
acquire a data set comprising color data and geometric data, said geometric data comprising a set comprising at least one relevant face;
determine from said geometric data geometric information for said at least one relevant face, said geometric information comprising locations of vertices of said at least one relevant face;
generate from said set of initial faces a set comprising at least one geometry face, each of said at least one geometry face generated by assigning to one of said set of initial faces said geometric information for said at least one relevant face; and
render an image from a point of view using said set of geometry faces and said color data;

wherein at least one of the following is true:
a. for each of said at least one geometry face, said step of assigning said geometric information is effectuated by, for each vertex of said at least one geometry face, assigning to said each vertex of said at least one geometry face a geometric location of a corresponding vertex of said at least one relevant face;
b. said at least one relevant face is generated in a manner selected from the group consisting of for each relevant frame, after a predetermined time, whenever there is a coherency change in the geometry, and any combination thereof, said predetermined time being in a range from 0.01 s to 10 s;
c. selecting a number of faces in said set of initial faces to be in a range from 1 to $10^6$;
d. selecting a number of faces in said set of initial faces to be 50,000; and
e. providing a number of faces in said set of initial faces in metadata in said texture data set.

11. The non-transitory processor-readable medium storing code representing instructions of claim 10, wherein said instructions are configured to ensure that, for each of said set comprising at least one geometry face, said assignment of said geometric information is effectuated by, for each vertex of said geometry face, assigning to said each vertex of said geometry face a geometric location of a corresponding vertex of said at least one relevant face.

12. The non-transitory processor-readable medium storing code representing instructions of claim 10, wherein said instructions are additionally configured, when executed, to perform at least one of the following:

a. store a number of said at least one relevant face and a location of said at least one relevant face in at least one additional line of said data set;
b. store said color data and said geometric data as either YUV or logarithmic Y'U'V' values;
c. provide said color data comprising a plurality of encoding parameters, each of said plurality of encoding parameters being used in a different portion of said color data;
d. store said geometric data only in the most significant bits of geometric data bytes;
e. select a number of faces in said set of initial faces to be in a range from 10 to $10^6$;
f. select a number of faces in said set of initial faces to be 50,000;
g. provide in metadata in said data set a number of faces in said set of initial faces;
h. select a location of said faces in said set of initial faces from the group consisting of noise, a random number, a fixed location, and any combination thereof, and select said fixed location from the group consisting of an origin of a coordinate system or a location outside of said point of view; and
i. assign a single location to unneeded faces, unneeded faces being faces in said set of initial faces and not in said set comprising at least one geometry face; and select said single location from the group consisting of an origin of a coordinate system or a location outside of said point of view.

* * * * *